(12) United States Patent
Martin et al.

(10) Patent No.: US 7,946,231 B2
(45) Date of Patent: May 24, 2011

(54) SINGLE ARM ROW CLEANER

(76) Inventors: Howard D. Martin, Elkton, KY (US);
Ronald S. Martin, Elkton, KY (US)

( * ) Notice: Subject to any disclaimer, the term of this patent is extended or adjusted under 35 U.S.C. 154(b) by 0 days.

(21) Appl. No.: 12/497,621

(22) Filed: Jul. 3, 2009

(65) Prior Publication Data
US 2010/0000451 A1  Jan. 7, 2010

Related U.S. Application Data

(60) Provisional application No. 61/133,867, filed on Jul. 3, 2008.

(51) Int. Cl.
| | |
|---|---|
| A01B 15/16 | (2006.01) |
| A01B 21/02 | (2006.01) |
| A01B 23/06 | (2006.01) |
| A01C 5/00 | (2006.01) |
| A01C 7/18 | (2006.01) |

(52) U.S. Cl. ............ 111/60; 111/62; 111/140; 111/143; 111/157; 172/551; 172/558; 172/610

(58) Field of Classification Search .................. 172/551, 172/599, 573, 579, 576, 117, 197, 558, 559, 172/776, 610; 111/52, 60, 62, 139–143, 111/123, 136, 170, 157, 162, 165; 37/195, 37/423, 449
See application file for complete search history.

(56) References Cited

U.S. PATENT DOCUMENTS

| | | | |
|---|---|---|---|
| 4,760,806 | A | 8/1988 | Bigbee et al. |
| 4,785,890 | A | 11/1988 | Martin |
| 5,341,754 | A | 8/1994 | Winterton |
| 5,507,351 | A | 4/1996 | Martin |
| 5,878,678 | A | 3/1999 | Stephens |
| 5,970,892 | A | 10/1999 | Wendling et al. |
| 6,135,037 | A | 10/2000 | Juptner |
| 6,223,663 | B1 | 5/2001 | Wendling et al. |
| 6,253,692 | B1 | 7/2001 | Wendling et al. |
| 6,530,334 | B2 | 3/2003 | Hagny |
| 6,834,598 | B2 | 12/2004 | Juptner |
| 2004/0187753 | A1 | 9/2004 | Robillard |
| 2005/0072344 | A1 | 4/2005 | Kester |

*Primary Examiner* — Christopher J. Novosad
(74) *Attorney, Agent, or Firm* — Hamilton IP Law, P.C.; Jay R. Hamilton; Charles A. Damschen

(57) ABSTRACT

A single arm row cleaner unit mountable to a grain drill opener arm includes a row cleaner arm and a mounting saddle. The mounting saddle is generally configured for attachment to a main arm of a furrow forming assembly. A row cleaner arm may be pivotally attached to the mounting saddle about a mandrel, and a row cleaner wheel may be pivotally mounted to the row cleaner arm. A biasing member may be positioned adjacent the mandrel to engage the row cleaner arm and a biasing member retainer, which may be affixed to the mounting saddle. A deflector may be positioned adjacent the row cleaner wheel and biased there against. A connector and lever arm may be used to communicate forces from a closing wheel arm to the row cleaner wheel for adequate clearance of the row cleaner wheel during transport of the grain drill.

9 Claims, 11 Drawing Sheets

SINGLE ARM ROW CLEANER

CROSS REFERENCE TO RELATED APPLICATIONS

This application claims the filing benefit under 35 U.S.C. §119(e) of provisional U.S. Pat. App. Ser. No. 61/133,867 filed on Jul. 3, 2008.

FIELD OF THE INVENTION

The methods and apparatuses described herein are generally applicable to the field of agricultural equipment. The embodiments shown and described herein are more particularly for improved row cleaning for delivery of seed or fertilizer. Although in no way limiting, the present disclosure is particularly suited for minimum or no-till conditions.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. §1.171 (d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

The term "grain drill," or more simply "drill," commonly refers to a seeder lacking the capability of seed singulation. Instead, the seed is metered volumetrically. Drills tend to have the furrow forming assemblies mounted to achieve narrow row spacing, although they may be mounted in a staggered pattern on two or more ranks. Drills are manufactured employing a wide variety of furrow forming assemblies, including non-rolling openers referred to as "hoe," "knife," or "sweep," depending on the shape of the sliding component used, and both single- and double-disc openers.

No-till and minimum-till agricultural practices have become more widespread in recent years. Accordingly, the market for no-till and minimum-till grain drills has grown. One such grain drill is disclosed in U.S. Pat. No. 4,760,806 issued to Bigbee et al. for "Conservation Opener," which is incorporated herein in its entirety. Various styles and types of row cleaning wheels exist for use with row cleaners mounted on either planter row units or grain drills. The proliferation of no-till planting has lead to other products related to row cleaners, such as that disclosed in U.S. Pat. No. 5,507,351 issued to Martin for "Cleaner for Tined Wheels," which is incorporated herein in its entirety.

One popular grain drill employing depth regulating and furrow closing assemblies with vertical relations that may be adjusted independently from one another is manufactured by Deere and Company, of Moline, Ill., and sold as the John Deere model no. 750 and its derivatives, the 752, 1850, 1860, and 1560. The 750-style opener unit has closing wheels inclined at twenty to twenty four degrees from the vertical and approximately eight degrees from the direction of travel.

The narrow spacing between the opener units and the "boxed in" configuration of the frame of the John Deere 750 drill have to date made it difficult to attach a suitable row cleaner thereto. For optimal performance, the row cleaner should be compact, adjustable, easily attached, aggressive enough to remove heavy residue for improved row clearing while not plugging adjacent or trailing opener units. The row cleaner design should inhibit or resist residue winding or wrapping between the deflector and the row cleaner wheel. Additionally, the row cleaner should allow for significant and/or adjustable down pressure to provide adequate clearing while floating (i.e., following the contour of the ground surface) if it meets with an obstacle. Finally, the row cleaner should allow adequate ground clearance when the frame of the grain drill is raised for transport.

BRIEF DESCRIPTION OF FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION—LISTING OF ELEMENTS

Figure 1:
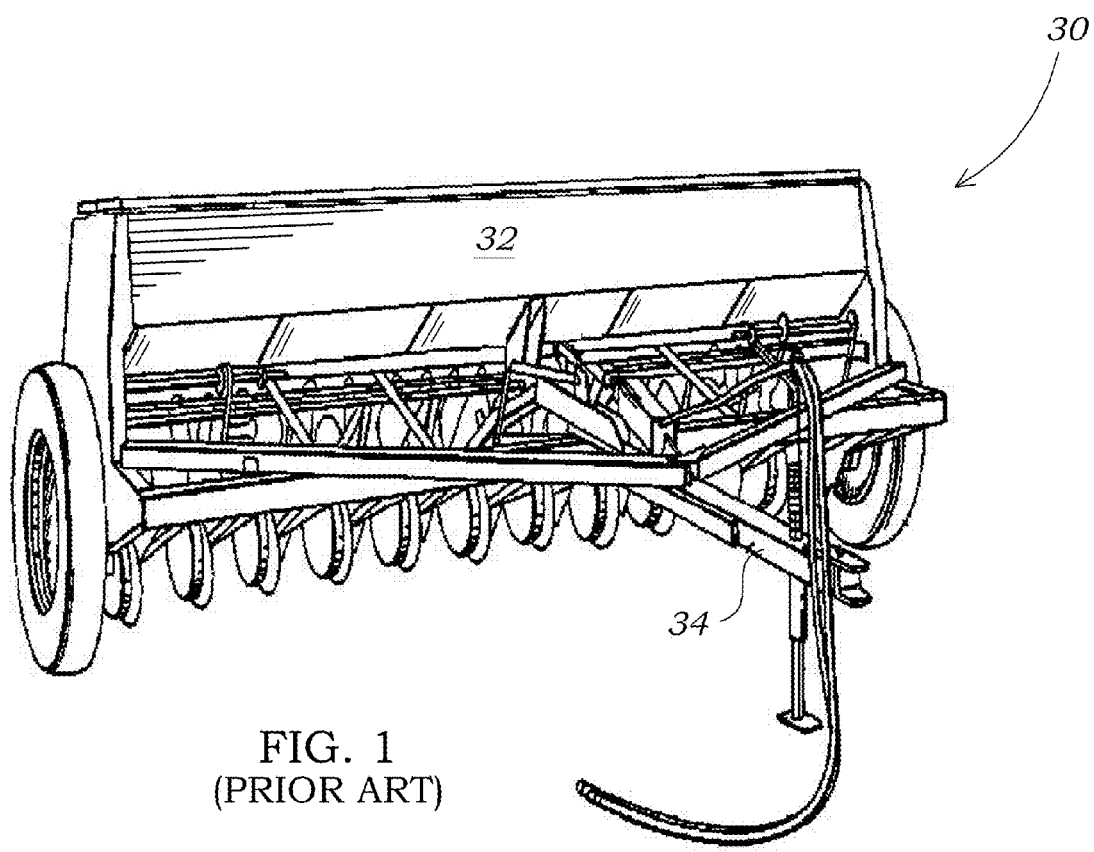
FIG. 1 provides a perspective illustration of a prior art grain drill to which the single arm row cleaner may be mounted.

| Element Description | Element Number |
|---|---|
| Single arm row cleaner | 10 |
| Row cleaner arm | 12 |
| Mounting aperture | 12a |
| Wheel aperture | 12b |
| Pin aperture | 12c |
| Connector aperture | 12d |
| Row cleaner wheel | 14 |
| Row cleaner wheel hub | 14a |
| Biasing member | 16 |
| Adjustment portion | 16a |
| Arm engaging portion | 16b |
| Connector | 17 |
| Lever arm | 18 |
| Lever arm bracket | 19 |
| Bracket side | 19a |
| Bracket bolt | 19b |
| Bracket nut | 19c |
| Mounting saddle | 20 |
| Body | 20a |
| Front portion | 20b |
| Aperture | 22 |
| Biasing member retainer | 24 |
| Mandrel | 26 |
| Mounting saddle connector | 28 |
| Grain drill | 30 |
| Hopper | 32 |
| Hitch | 34 |
| Toolbar | 36 |
| Nut | 37 |
| Bolt | 38 |
| Furrow forming assembly | 40 |
| Opener arm assembly | 42 |
| Main arm | 43 |
| Down pressure mount | 43a |
| Main arm lower end | 44 |
| Opener | 45 |
| Disc hub | 46 |
| Seed delivery member | 48 |
| Bracket assembly | 50 |
| Anchor | 52 |
| Main arm support | 52a |
| Down pressure support | 52b |
| Cap | 54 |
| Flange | 56 |
| Depth regulator assembly frame | 60 |
| Press wheel arm mount | 60a |
| Closing wheel arm mount | 60b |
| Depth regulator | 61 |
| Press wheel arm | 62 |
| Press wheel | 64 |
| Closing wheel arm | 66 |
| Closing wheel | 68 |
| Down pressure assembly | 70 |
| Down pressure biasing member | 72 |
| Down pressure bracket mount | 74 |
| Down pressure arm mount | 76 |
| Tension link assembly | 78 |
| Deflector | 80 |
| Deflector arm | 82 |
| Deflector blade | 84 |
| Pin | 86 |
| Deflector biasing member | 88 |

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

DETAILED DESCRIPTION OF INVENTION

Referring now to the drawings, wherein like reference numerals designate identical or corresponding parts throughout the several views, FIG. 1 provides a perspective view of a John Deere model 750 grain drill 30 to which the single arm row cleaner 10 may be coupled. The grain drill 30 in FIG. 1 includes at least one hopper 32 for storing material and a hitch adapted for connection to a prime mover, such as a tractor. The general use and structure of such a grain drill 30 is well known to those skilled in the art and will not be described further herein for the purpose of clarity.

Figure 2:
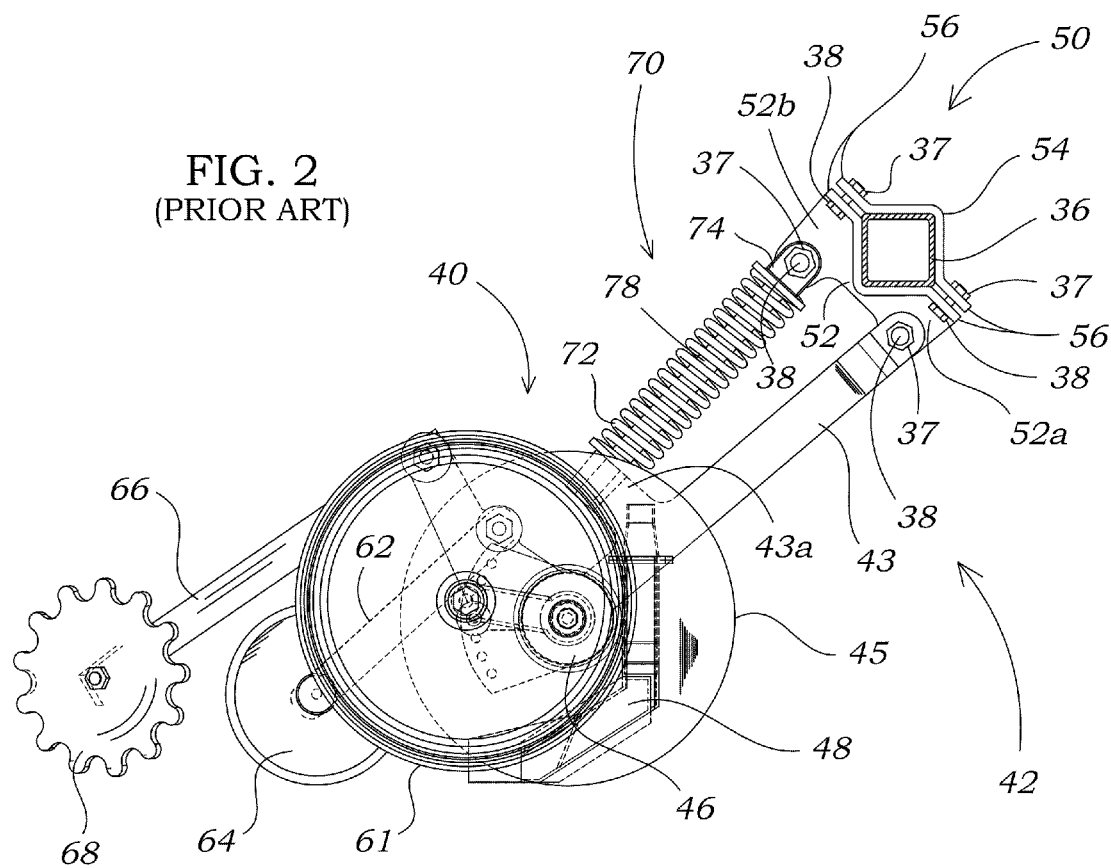
FIG. 2 provides a detailed side view a prior art furrow opening mechanism to which the single arm row cleaner may be mounted.

A more detailed view of a furrow forming assembly 40 is shown in FIG. 2, which furrow forming assembly 40 is typically associated with the grain drill 30 depicted in FIG. 1. The furrow forming assembly 40 includes an opener 45, which in the embodiment shown in FIG. 2 is a single disc. The opener 45 is supported at an angle with respect to the direction of travel by an opener arm assembly 42 and functions to open a furrow in the ground surface. The opener arm assembly 42 is pivotally mounted to a toolbar 36 via a bracket assembly 50 as is well known to those skilled in the art.

The bracket assembly 50 includes an anchor 52 and a cap 54. Both the anchor 52 and the cap 54 include flanges 56, wherein corresponding flanges 56 of the anchor 52 and cap 54 abut one another when the bracket assembly 50 is affixed to the toolbar 36. The anchor 52 and cap 54 may be secured to one another via a plurality of nuts 37 and bolts 38 positioned in corresponding apertures (not shown) fashioned in the flanges 56 of the anchor 52 and cap 54. The anchor 52 includes a main arm support 52a and a down pressure support 52b, both of which may be integrally formed with the anchor 52 for pivotally engaging the main arm 43 and down pressure assembly 70, respectively, which is described in more detail below.

The opener arm assembly includes a main arm 43 with a bifurcated upper end adjacent the bracket assembly 50. The main arm 43 pivotally engages the main arm support 52a formed in the anchor 52. The main arm 43 includes a main arm lower end 44 opposite the bracket assembly 50 and a down pressure mount 43a positioned between the main arm lower end 44 and the bracket assembly 50. The opener 45 is pivotally mounted to the main arm lower end 44 about a disc hub 46.

A down pressure assembly 70 is pivotally mounted at a down pressure bracket mount 74 to the down pressure support 52b formed in the anchor 52. The down pressure assembly 70 is mounted to the down pressure mount 43a formed in the main arm 43 at the down pressure arm mount 76 such that the down pressure assembly 70 is nearly parallel to the main arm 43. The down pressure assembly 70 provides a downward bias to the opener 45. The down pressure assembly 70 as shown herein includes a tension link assembly 78 that may be variable in length around which a down pressure biasing member 72 (i.e., a spring in the embodiment shown herein) is positioned. The down pressure biasing member 72 exerts a force on the down pressure support 52*b* and the down pressure mount 43*a* so as to bias them apart from one another, thereby exerting an extension force to the tension link assembly 78.

A depth regulator assembly frame 60 is positioned adjacent the main arm lower end 44. A depth regulator 61 is pivotally mounted to the depth regulator assembly frame 60 such that the depth regulator 61 serves to limit the depth to which the opener 45 penetrates the ground surface and may also firm the furrow wall. A seed delivery member 48 is mounted adjacent the opener 45 near the main arm lower end 44 to direct material to the furrow formed by the opener 43. The depth regulator assembly frame 60 includes a press wheel arm mount 60*a* and a closing wheel arm mount 60*b*, both of which may be integrally formed with the depth regulator assembly frame 60. A press wheel arm 62 may be pivotally mounted to the press wheel arm mount 60*a* at a first end of the press wheel arm 62, and a press wheel 64 may be pivotally mounted at a second end of the press wheel arm 62. The press wheel 64 functions to push the material into the soil at the bottom of the furrow. A closing wheel arm 66 may be pivotally mounted to the closing wheel arm mount 60*a* at a first end of the closing wheel arm 66, and a closing wheel 68 may be pivotally mounted to a second end of the closing wheel arm 66. The closing wheel 68 functions to position soil over the material located in the furrow.

Figure 3A:
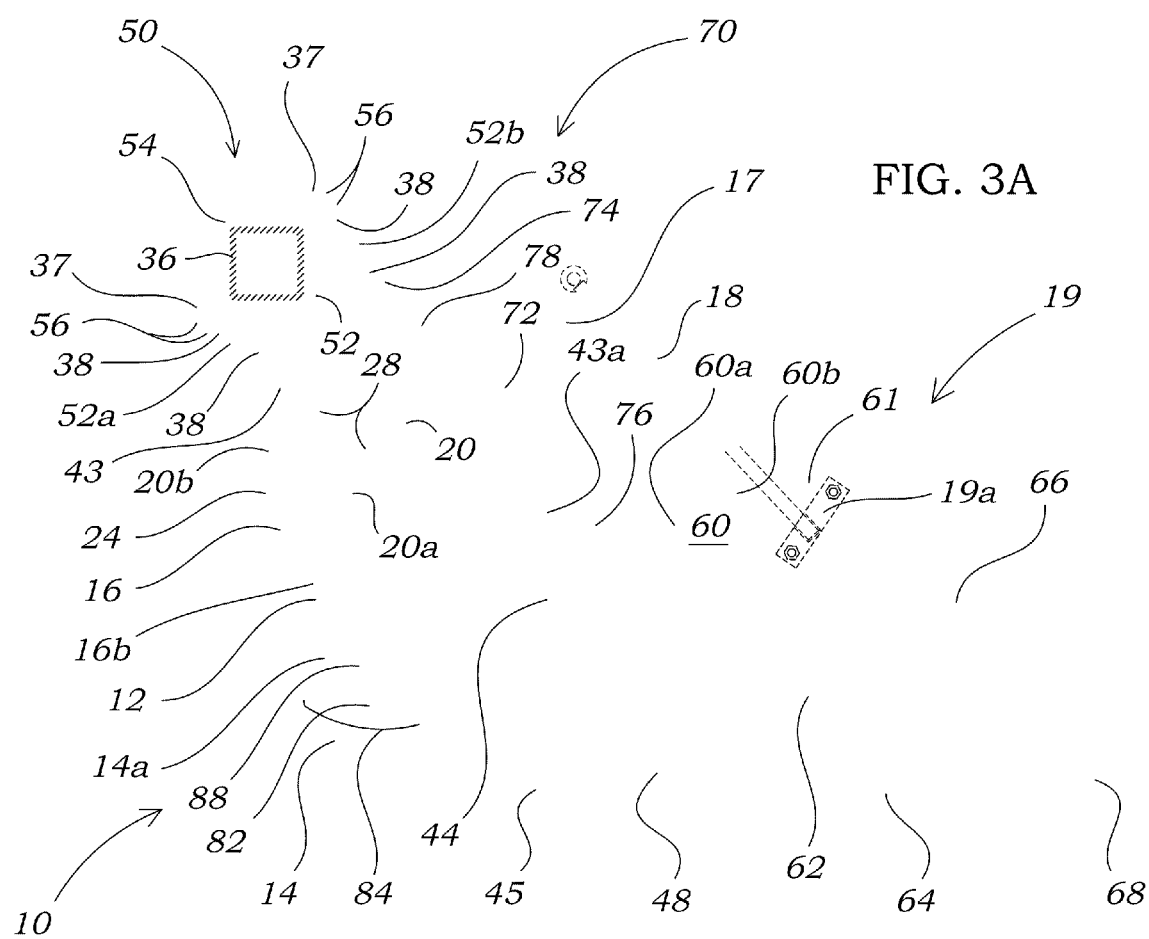
FIG. 3A provides an inner side view of one embodiment of the row cleaner mounted to the prior art furrow opening mechanism shown in FIG. 2.
Figure 3B:
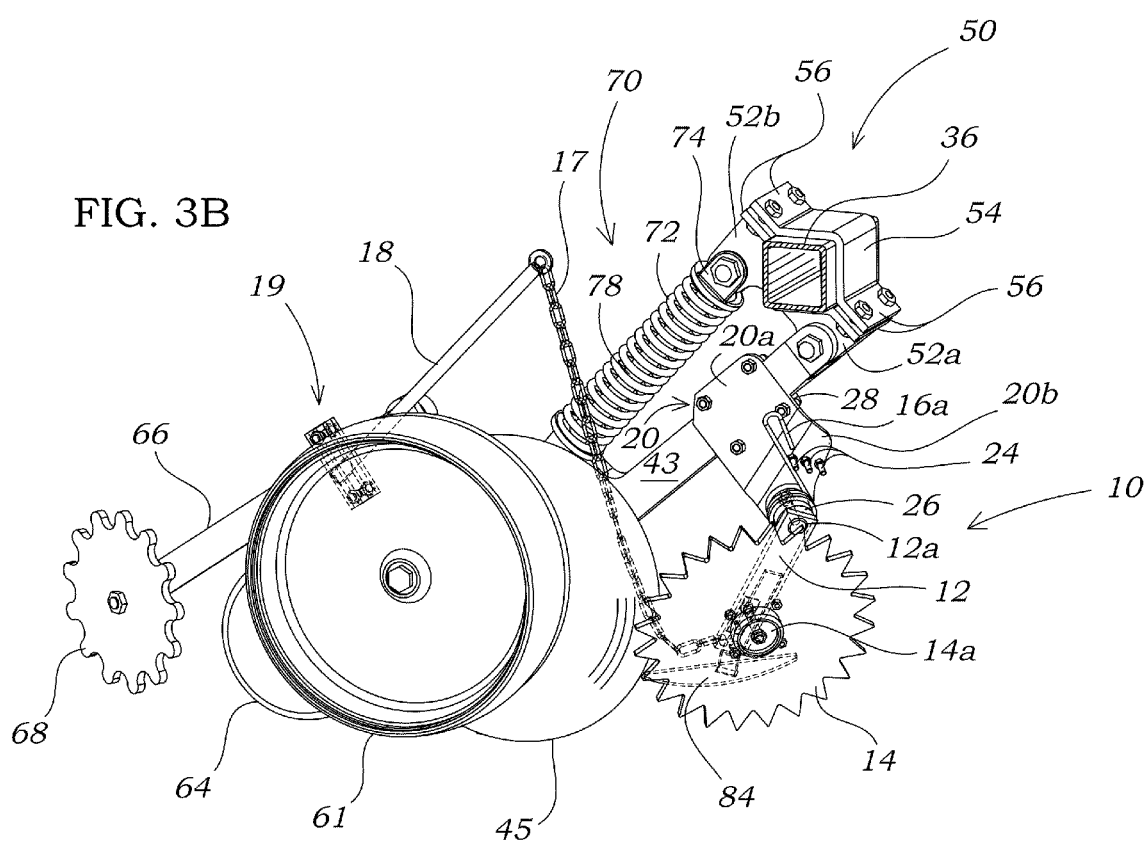
FIG. 3B provides an outer perspective view of one embodiment of the row cleaner mounted to the prior art furrow opening mechanism shown in FIG. 2.
Figure 3C:
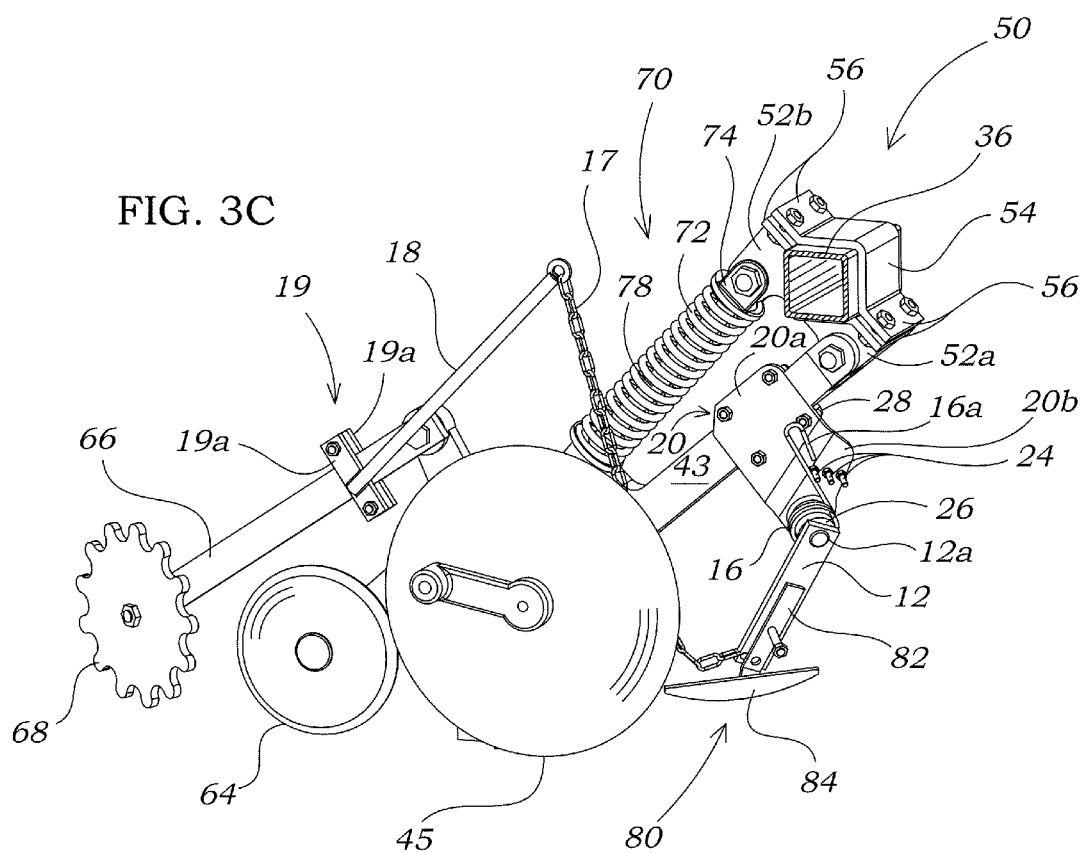
FIG. 3C provides an outer perspective view of one embodiment of the row cleaner mounted to the prior art furrow opening mechanism shown in FIG. 2, wherein the row cleaner wheel and depth regulator have been removed for clarity.
Figure 4A:
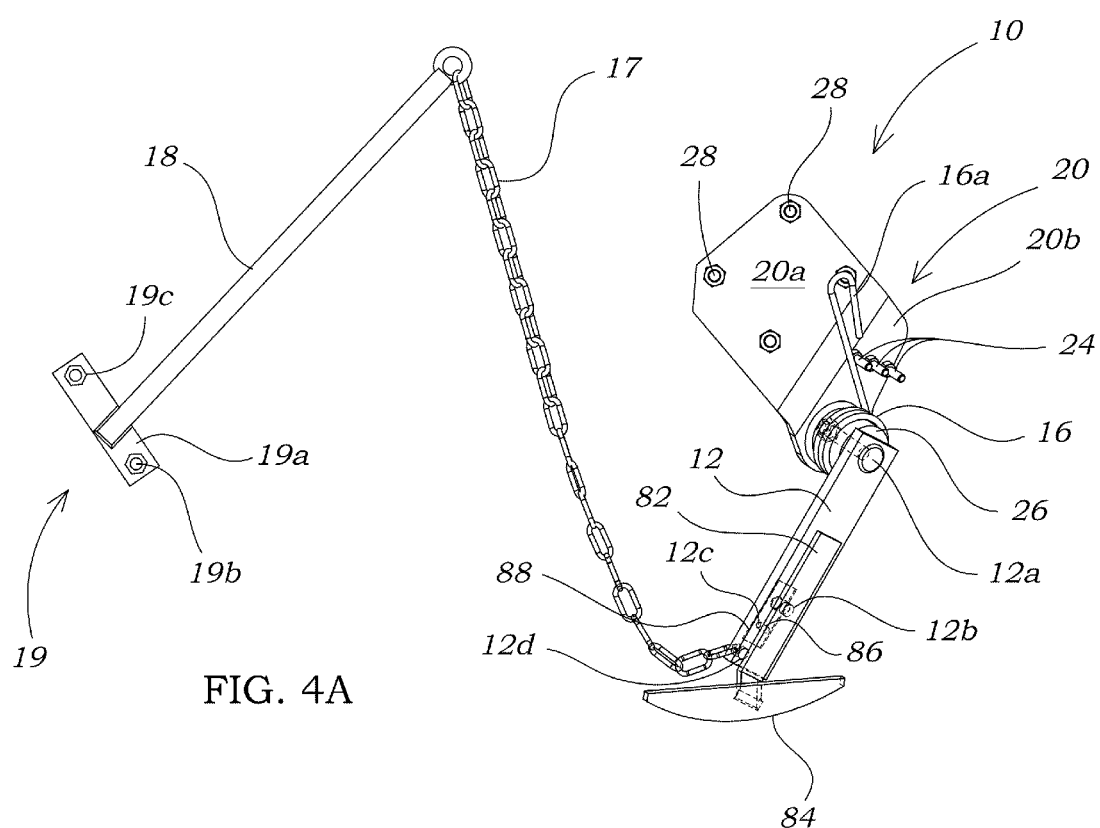
FIG. 4A provides an outer perspective view of one embodiment of the row cleaner removed from the furrow opening mechanism and with the row cleaner wheel removed for clarity.
Figure 4B:
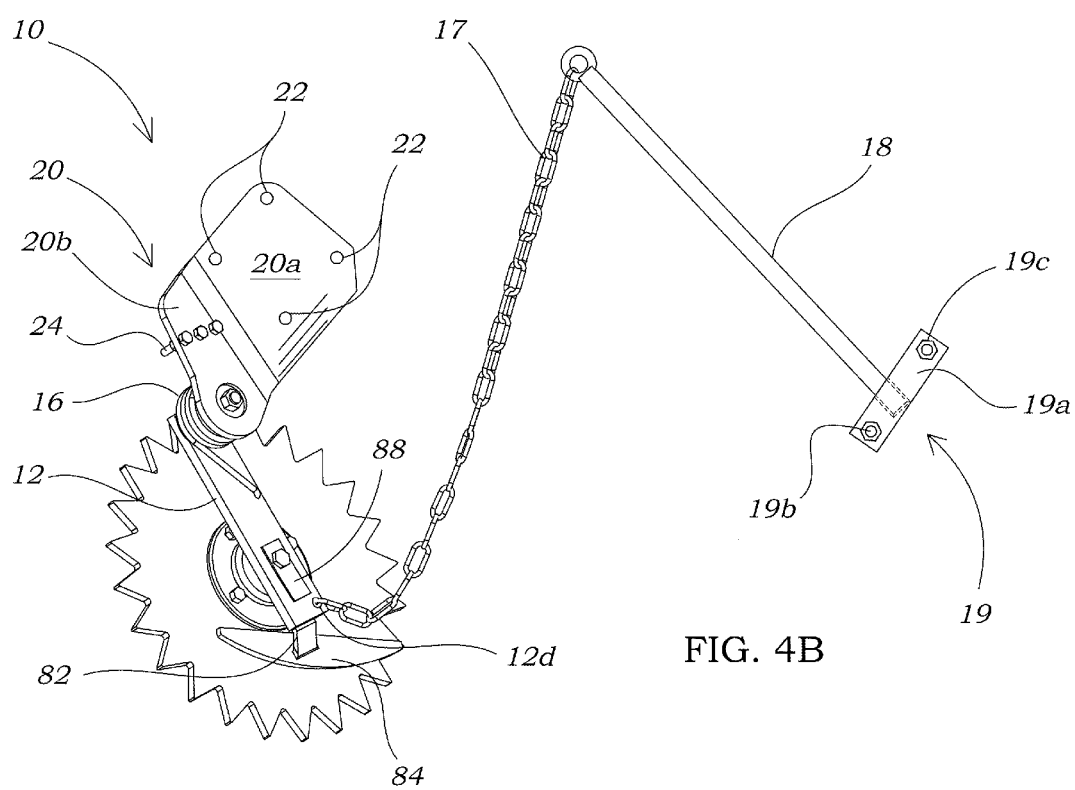
FIG. 4B provides an inner perspective view of one embodiment of the row cleaner removed from the furrow opening mechanism for clarity.

One embodiment of the single arm row cleaner 10 employed with the furrow forming assembly 40 previously described is shown in FIG. 3. Generally, the single arm row cleaner 10 functions to clear residue from a narrow path in front of the opener 45 and to prevent residue from being positioned in the furrow. The single arm row cleaner 10 includes a mounting saddle 20 having a body 20*a* and a front portion 20*b*, which are integrally formed with one another in the embodiment pictured herein. The mounting saddle 20 is configured to be fixedly mounted to the main arm 43 of the furrow forming assembly 40, which is accomplished through mounting saddle connectors 28. In the embodiment pictured herein, the mounting saddle connectors 28 are fashioned as two u-bolts and corresponding pairs of nuts, wherein the u-bolts generally follow the periphery of three sides of the main arm 43 and the ends thereof pass through apertures 22 formed in the body 20*a*. Any structure and/or method known to those skilled in the art may be used to secure the mounting saddle 20 to the main arm 43, and therefore is in no way limiting in scope to the single arm row cleaner 10. Furthermore, the mounting saddle 20 may be integrally formed with the main arm 43 in other embodiments of the single arm row cleaner 10 not pictured herein.

A row cleaner arm 12 is pivotally mounted to the mounting saddle about a mandrel fashioned in the front portion 20*b* of the mounting saddle 20. The row cleaner arm 12 includes a mounting aperture 12*a* formed on the upper end thereof, such that a bolt 38 and nut 37 may be used to attach the row cleaner arm 12 to the mandrel 26. A wheel aperture 12*b* is formed in the row cleaner arm 12 about which a row cleaner wheel 14 is pivotally mounted via a row cleaner wheel hub 14*a*. Other types of mounting structures and/or methods known to those skilled in the art may be used for mounting the row cleaner arm 12 to the mandrel 26 and/or mounting the row cleaner wheel hub 14*a* to the row cleaner arm 12. Different types of row cleaner wheels 14 may be used with the single arm row cleaner 14 in other embodiments thereof not pictured herein. For example, tined, spiked, or multi-diameter row cleaner wheels may be used with the single arm row cleaner 10 without departing from the spirit and scope thereof. Accordingly, the scope of the single arm row cleaner 10 is not limited by the type and/or style of row cleaner wheel 14 used therewith.

A biasing member 16 may be used to bias the row cleaner wheel 14 toward the ground surface, as shown in the embodiments pictured herein. The biasing member 16 in the embodiment pictured herein is comprised of a coil spring, but may be comprised of any structure and/or method known to those skilled in the art that is suitable for the particular application of the single arm row cleaner 10, such as a pneumatic system, electrical system, etc. The biasing member 16 as shown herein includes an adjustment portion 16*a* and an arm engaging portion 16*b*, both of which extend from the biasing member 16. The adjustment portion 16*a* is fashioned to engage one of several biasing member retainers 24 formed in the front portion 20*b* of the mounting saddle 20. The arm engaging portion 16*b* is fashioned to engage the row cleaner arm 12.

The operator may adjust the amount of downward force the biasing member 16 exerts on the row cleaner wheel 14 by changing the position of the adjustment portion 16*a* with respect to the biasing member retainers 24 to either add to or remove tension from the biasing member 16. Even when adjusted to exert the maximum amount of downward force on the row cleaner wheel 14, the single arm row cleaner 10 still allows the row cleaner wheel 14 to move upward through the pivoting action of the row cleaner arm 12 if the row cleaner wheel 14 encounters an obstruction of sufficient force. That is, if the force of the obstruction (such as a stone or hard clod of soil) is large enough to overcome the downward force exerted by the biasing member 16 on the row cleaner wheel 14, the row cleaner arm 12 will pivot against the biasing member 16 and allow the row cleaner wheel 14 to move upward. Other methods of adjusting the amount of force the biasing member 16 exerts on the row cleaner wheel 14 will become apparent to those skilled in the art in light of the present disclosure, and any structure and/or method known to those skilled in the art for adjusting the amount of force the biasing member 16 exerts on the row cleaner wheel 14 may be used with the single arm row cleaner 10 without departing from the spirit and scope thereof.

In the embodiment pictured herein, a lever arm 18 is operably engaged with the closing wheel arm 66 via a lever arm bracket 19. The lever arm bracket 19 engages the closing wheel arm 66 in such a manner as to allow the position of the lever arm bracket 19 along the length of the closing wheel arm 66 to vary from one situation to the next. In the embodiment shown herein, this is accomplished by allowing the lever arm bracket 19 to slidably engage the closing wheel arm 66. The lever arm bracket 19 in the embodiment pictured herein is comprised of two bracket sides 19*a*, one of which is attached to the lever arm 18 on a first side of the closing wheel arm 66, and another of which is positioned on the opposite side of the closing wheel arm 66. The two bracket sides 19*a* are affixed to one another via two bracket bolts 19*b* and bracket nuts 19*c*, such that the closing wheel arm 66 is positioned between the portion of the two bracket bolts 19*b* that is located between the two bracket sides 19*a*. Other structures and/or methods for slideably engaging the lever arm bracket 19 with the closing wheel arm 66 will become apparent to those skilled in the art in light of the present disclosure, and any such structure and/or method may be used with the single arm row cleaner 10 without departing from the spirit and scope thereof. The position of the lever arm bracket 19 with respect to the closing wheel arm 66 may be fixed by tightening the bracket nuts 19*c* sufficiently so that the bracket sides 19*a* contact the sides of the closing wheel arm 66 with enough force to secure the position of the lever arm bracket 19 with respect thereto.

The single arm row cleaner 10 as shown herein also includes a connector 17, which is fashioned as a linked chain in the embodiments pictured herein. A first end of the connector 17 is attached to the row cleaner arm 12 at a connector aperture 12d fashioned in the row cleaner arm 12 opposite the mounting aperture 12a. A second end of the connector 17 is attached to the lever arm 18 at the end of the lever arm 18 opposite the lever arm bracket 19. In other embodiments of the single arm row cleaner 10 not pictured herein, the connector may be fashioned in different manners. For example, in one embodiment the connector 17 may be fashioned as a metallic cable. Accordingly, any structure that serves to communicate forces from the lever arm 19 to the row cleaner arm 12 in one direction may be used with the single arm row cleaner 10 without departing from the spirit and scope thereof.

Figure 5A:
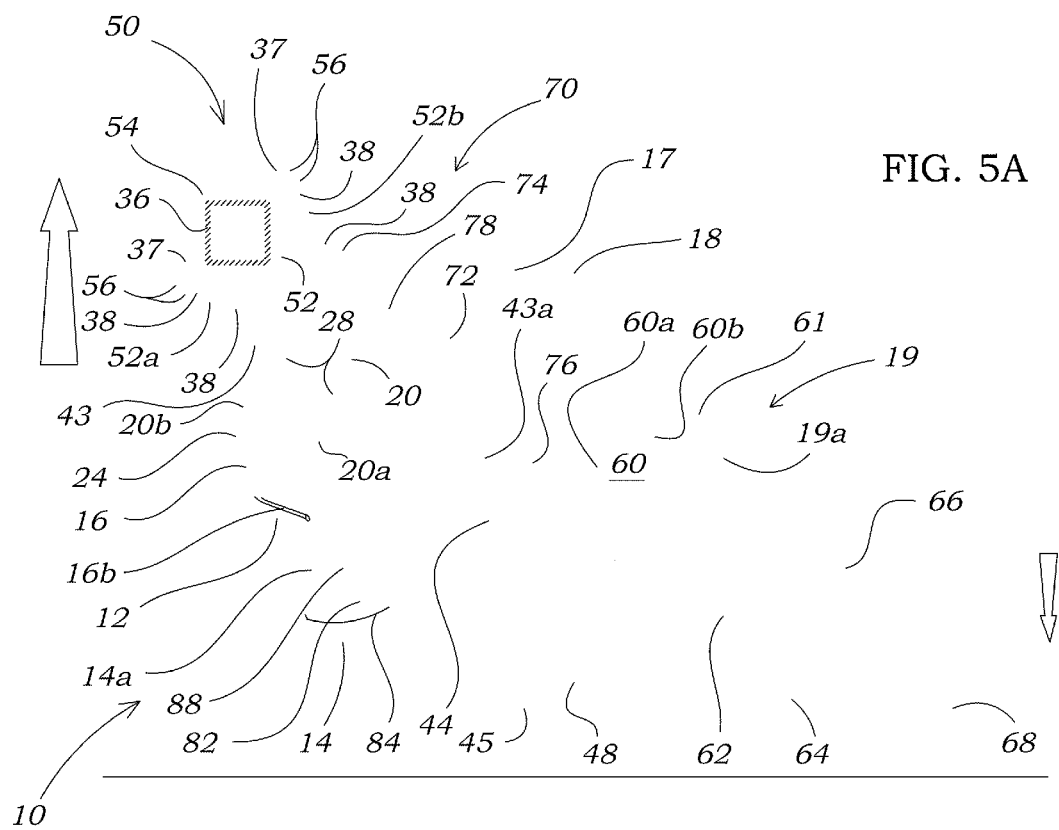
FIG. 5A provides a side view of the assembly shown in FIG. 3 with the furrow forming assembly raised to transport position.
Figure 5B:
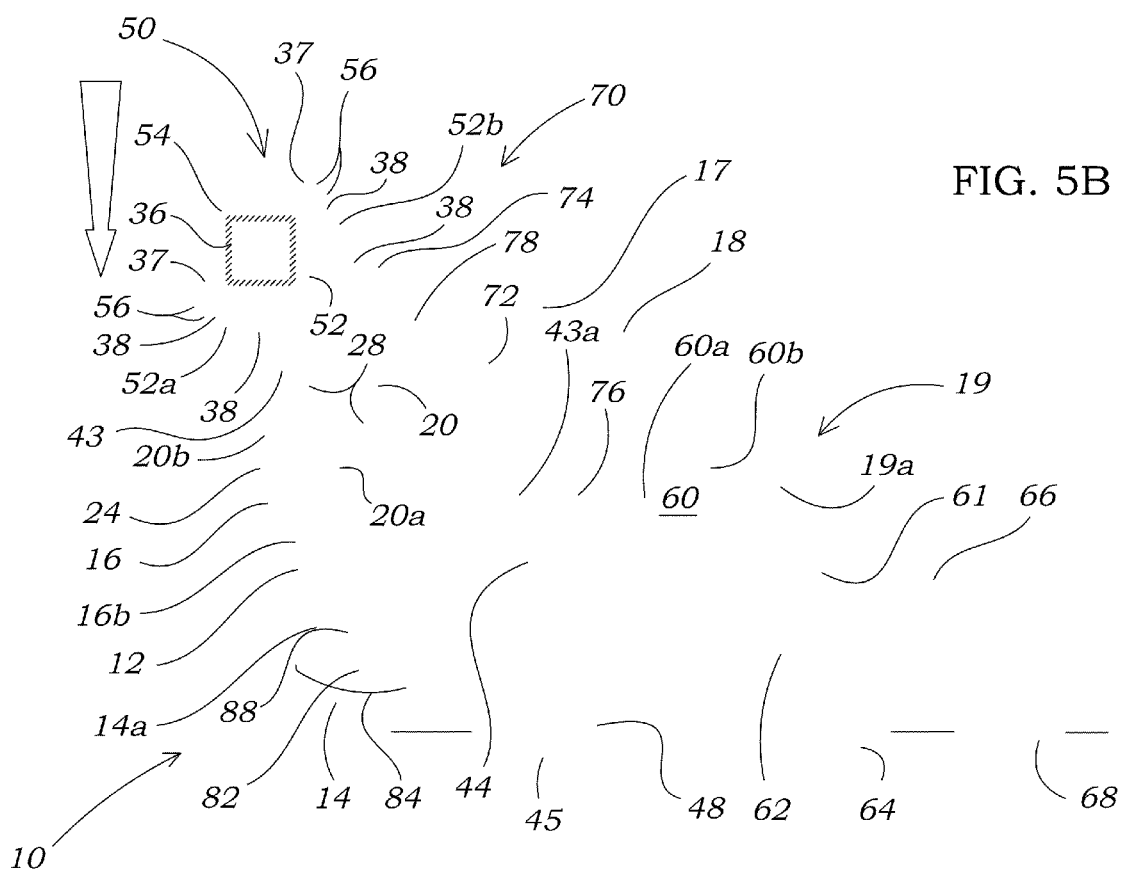
FIG. 5B provides a side view of the assembly shown in FIG. 3 with the furrow forming assembly lowered to a working position.

The connector 17 and lever arm 18 function to increase the ground clearance of the single arm row cleaner 10 when the frame of the grain drill 30 is raised for transport. When the furrow forming assembly 40 is raised (i.e., when the grain drill 30 is configured for transportation), the closing wheel arm 66 pivots downward. The lever arm bracket 19 may be configured so that its position is fixed with respect to the closing wheel arm 66 so that as the closing wheel arm 66 pivots downward, the lever arm bracket 19 moves downward as well, which causes the opposite end of the lever arm 18 to move upward. The connector 17 transfers this upward motion to the row cleaner arm 12, as shown in FIG. 5A. If the position of the lever arm bracket 19 on the closing wheel arm 66, the force of the biasing member 16, the weight of the closing wheel 68 and closing wheel arm 66, and the weight on the row cleaner arm 12 adjacent the connector aperture 12d are properly configured, the row cleaner wheel 14 will move upward when the grain drill 30 is configured for transport. During normal operation, as depicted in FIG. 5B, both the row cleaner wheel 14 and the closing wheel 68 are generally in contact with the ground surface. Accordingly, some slack will be present in the connector 17 during normal operation since the ground surface acts upon both the row cleaner wheel 14 and the closing wheel 68.

The position of the lever arm bracket 19 on the closing wheel arm 66 may be adjusted to affect greater lifting force on the row cleaner arm 12 when the grain drill 30 is configured for transport (i.e., when the closing wheel 68 moves downward). The further down the closing wheel arm 66 the lever arm bracket 19 is positioned, the more leverage the weight at the end of the closing wheel arm 66 will possess to act against the biasing member 16 so as to raise the row cleaning wheel 14. Therefore, the operator may adjust the position of the lever arm bracket 19 so that for a given set of parameters (e.g., closing wheel 68 weight, closing wheel arm 66 length, biasing member 16 force, etc.), the downward motion of the closing wheel arm 66 during transport will raise the row cleaner wheel 14 by the optimal amount.

Figure 6:
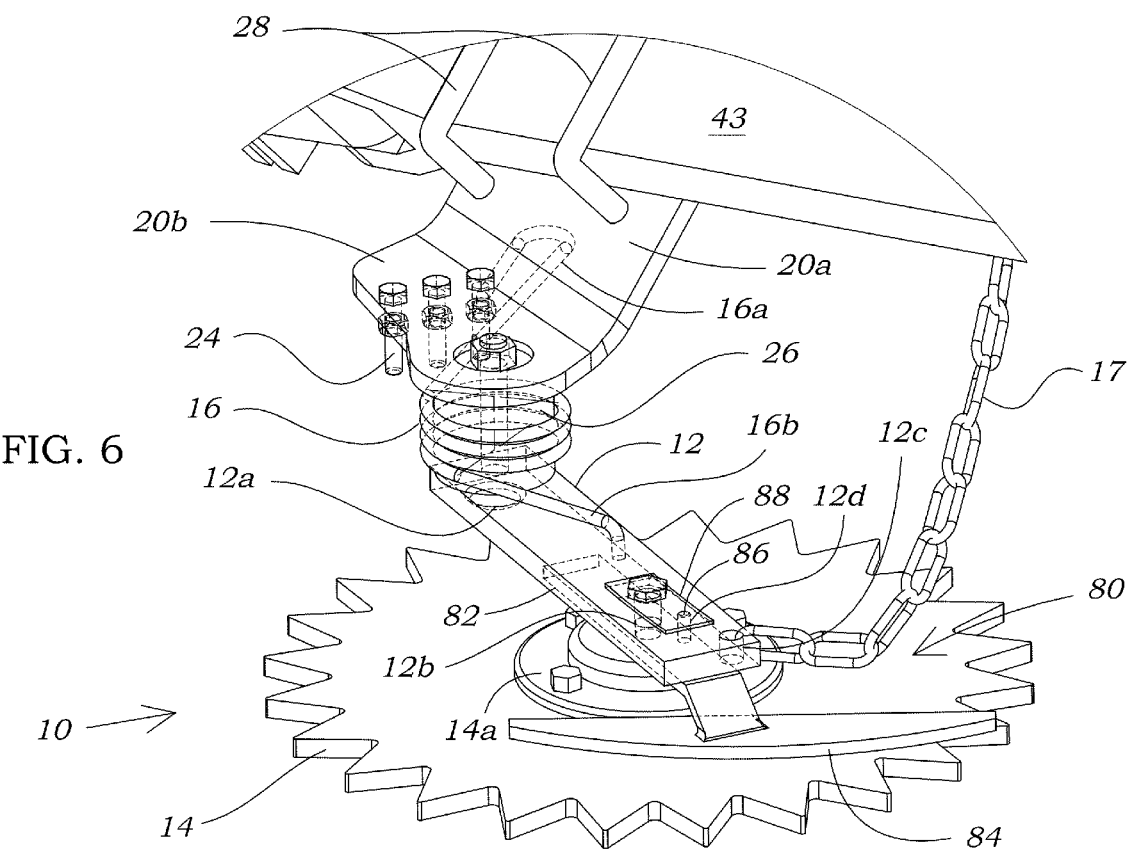
FIG. 6 provides a detailed inner view of one embodiment of a deflector and deflector biasing system for the single arm row cleaner.
Figure 7:
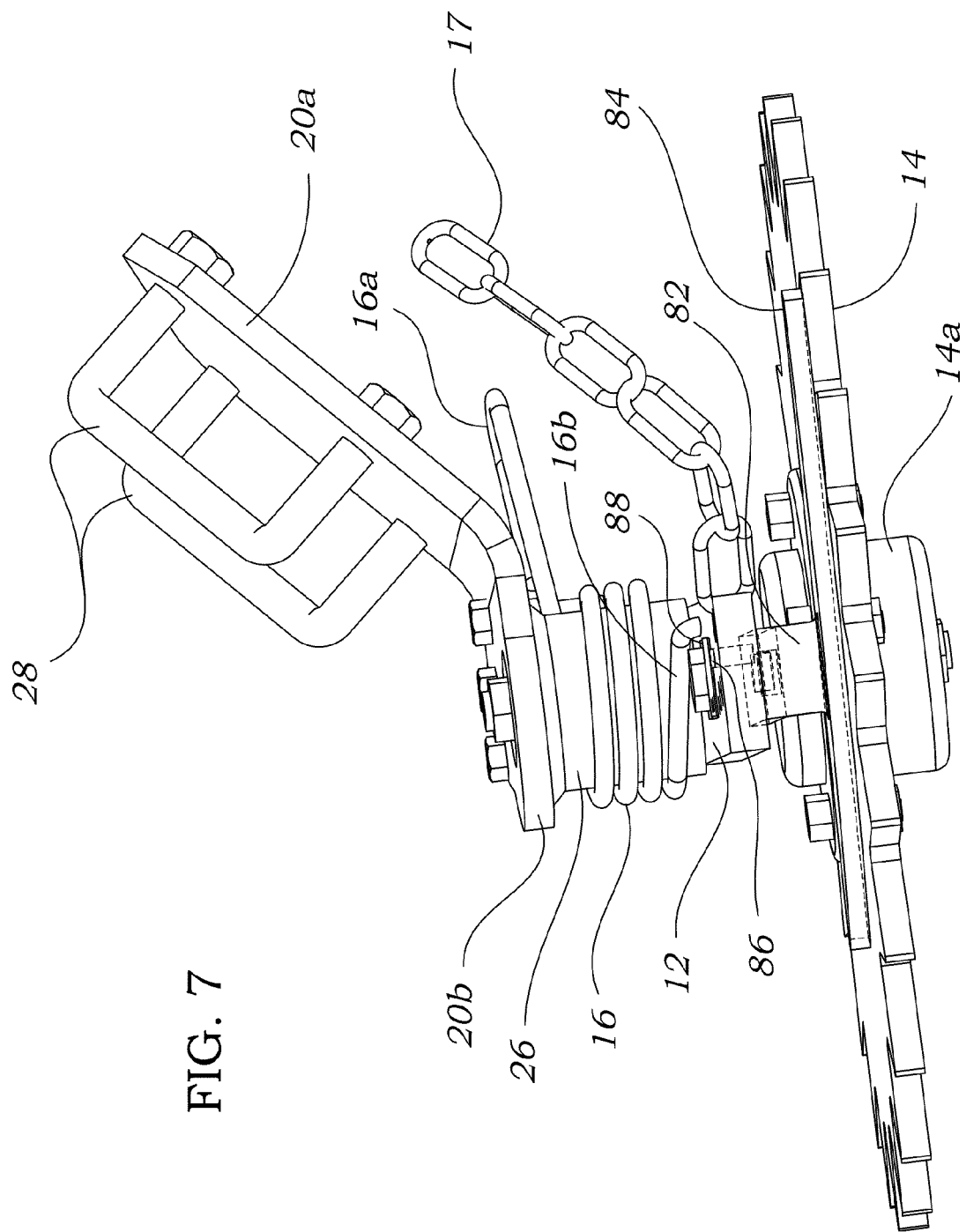
FIG. 7 provides a detailed bottom view of one embodiment of a deflector and deflector biasing system for the single arm row cleaner.

The single arm row cleaner 10 may include a deflector 80 positioned adjacent the row cleaner wheel 14, as shown in the various embodiments pictured herein. The deflector 80 functions to remove debris or foreign objects that have accumulated on the row cleaner wheel 14, and may also serve as a scraper to remove dirt or other material from the inner surface of the row cleaner wheel 14. The deflector in the embodiments pictured herein includes a deflector arm 82 that is substantially parallel with and mounted to the row cleaner arm 12, as best shown in FIG. 6. Affixed to the deflector arm is a deflector blade 84, which has a banana-type shape in the embodiment pictured herein. The deflector blade 84 is biased toward the row cleaner wheel 14 by a deflector biasing member 88 and pin 86, as best shown in FIG. 7.

The pin 86 fits within a pin aperture 12c formed in the row cleaner arm 12. The inner end of the pin 86 engages the deflector biasing member 88 and the outer end of the pin 86 engages the deflector arm 82. Accordingly, the deflector blade 84 is biased toward the inner surface of the row cleaner wheel 14 by an amount proportional to the spring force of the deflector biasing member 88. When the deflector blade 84 encounters an obstruction, if the obstruction is adhered to the row cleaner wheel 14 with sufficient force to overcome the biasing force of the deflector biasing member 88, the deflector blade 86 will move away from the row cleaner wheel 14, thereby causing the deflector arm 82 to act on the pin 86 and move it in a direction away from the row cleaner wheel 14 causing the deflector biasing member 88 to flex. The deflector blade 84 generally functions to engage and remove material accumulated on the row cleaner wheel 14, and the pin 86 in conjunction with the deflector biasing member 88 allow the deflector blade 84 to move if it encounters an obstruction of sufficient force. The single arm row cleaner 10 and deflector 80 as shown in the embodiments herein inhibit and resist residue winding or wrapping between the deflector 80 and the row cleaner wheel 14 because the biased contact between the deflector 80 and row cleaner wheel 14 promotes an almost continuous seal against residue wrapping.

It is contemplated that the various elements of the single arm row cleaner 10 disclosed herein may be constructed of any suitable material known to those skilled in the art. For example, the row cleaner arm 12, row cleaner wheel, lever arm 18, mounting saddle 20, and deflector 80 may be constructed of steel, iron, a high-resistance iron alloy, metallic alloys, and/or combinations thereof.

It should be noted that the single arm row cleaner 10 is not limited to the specific embodiments pictured and described herein, but is intended to apply to all similar methods and apparatuses for ground surface penetration and/or row cleaning during operation of planter, seeder, or grain drills 30. Accordingly, modifications and alterations from the described embodiments will occur to those skilled in the art without departure from the spirit and scope of the single arm row cleaner 10. Having described several embodiments, other features of the single arm row cleaner 10 will undoubtedly occur to those versed in the art, as will numerous modifications and alterations in the embodiments as illustrated herein, all of which may be achieved without departing from the spirit and scope of the single arm row cleaner 10.

What is claimed is:

1. A single arm row cleaner comprising:
   a. a mounting saddle configured to be affixed to a furrow forming assembly of a grain drill, said mounting saddle comprising:
      i. a body;
      ii. a front portion affixed to and angled with respect to said body; and
      iii. a mandrel, wherein said mandrel is affixed to said front portion;
   b. a row cleaner arm, wherein said row cleaner arm comprises:
      i. a mounting aperture formed in a first end of said row cleaner arm, wherein said mounting aperture is positioned adjacent said mandrel, and wherein said row cleaner arm is pivotally mounted with respect to said mounting saddle about said mandrel;
      ii. a wheel aperture formed in a second end of said row cleaner arm;

c. a row cleaner wheel, wherein said row cleaner wheel is rotatably mounted to said row cleaner arm about said wheel aperture;
d. a lever arm, wherein a first end of said lever arm is affixed to a closing wheel arm with a lever arm bracket; and
e. a connector, wherein a first end of said connector is affixed to a second end of said lever arm, wherein a second end of said connector is affixed to said row cleaner arm, and wherein said row cleaner arm, said lever arm, said closing wheel arm, and said connector are configured such that a predetermined amount of relative downward motion of said closing wheel arm induces relative upward motion of said closing wheel.

2. The single arm row cleaner according to claim 1 further comprising a biasing member, wherein a first end of said biasing member is secured in a biasing member retainer affixed to said mounting saddle, and wherein a second end of said biasing member is secured to said row cleaner arm via a biasing member engager affixed to said row cleaner arm between said wheel aperture and said mounting aperture.

3. The single arm row cleaner according to claim 2 further comprising a deflector, wherein said deflector is mounted to said single arm row cleaner adjacent said row cleaner wheel.

4. The single arm row cleaner according to claim 3 wherein said deflector is further defined as comprising:
a. a deflector arm, wherein said deflector arm is affixed to said row cleaner arm;
b. a deflector blade, wherein said deflector blade is affixed to said deflector arm, and wherein said deflector blade is positioned adjacent said row cleaner wheel;
c. a pin, wherein said pin is positioned in a pin aperture formed in said row cleaner arm, and wherein a first end of said pin engages said deflector arm; and
d. a deflector biasing member, wherein said deflector biasing member is affixed to said row cleaner arm and engages a second end of said pin.

5. The single arm row cleaner according to claim 4 wherein said single arm row cleaner is further defined as being affixed to a main arm of said furrow forming assembly of said grain drill.

6. The single arm row cleaner according to claim 5 wherein said body and said front portion of said mounting saddle are further defined as being integrally formed.

7. The single arm row cleaner according to claim 6 further comprising a mounting saddle connector, wherein said mounting saddle connector functions to attach said mounting saddle to said furrow forming assembly.

8. The single arm row cleaner according to claim 7 wherein said mounting saddle connector is further defined as a plurality of u-bolts.

9. The single arm row cleaner according to claim 8 wherein said single arm row cleaner further comprises a biasing member, wherein an adjustment portion of said biasing member is configured to engage at least one biasing member retainer affixed to said front portion of said mounting saddle, and wherein an arm engaging portion of said biasing member is configured to engage said row cleaner arm.

* * * * *